United States Patent Office 3,170,273

Patented Feb. 23, 1965

3,170,273

PROCESS FOR POLISHING SEMICONDUCTOR MATERIALS

Robert J. Walsh and Arno H. Herzog, St. Louis, Mo., assignors to Monsanto Company, a corporation of Delaware No Drawing. Filed Jan. 10, 1963, Ser. No. 250,987
11 Claims. (Cl. 51—281)

This invention relates to an improved process comprising the use of silica sols or gels for polishing semiconductor materials to a high degree of surface perfection. More particularly this invention relates to the use of silica sols or gels as polishing agents for the surfaces of semi-conductor crystals, which crystals are thereby rendered more suitable for use in the manufacture of semiconductor devices.

In the manufacture of semiconductor devices wherein an epitaxial crystal layer is deposited on a supporting crystal, one of the most important prerequisites for a high quality finished product is a highly polished mirror-like finish on the surface of the supporting crystal which is to receive the epitaxially deposited crystal layer. In an effort to achieve the necessary degree of surface perfection on the supporting crystal, many polishes, chemical etches, and combinations of polishes and etches have been used. And the prior art has advanced to such an extent that a polished crystal surface can be prepared free from imperfections detectable at a magnification of 500 times or more. However, in a typical polishing process which utilizes several polishes of graduated fineness, the final polishing agent, though able to remove surface scratches and pits, often does not remove damage to the crystal structure just below the surface caused by the preceding coarse polishes. These latent defects, exposed by acid etching, have a detrimental effect in the production of semiconductor devices similar to the visible defects. Polishing and etching techniques capable of removing this "worked surface" are often time consuming or expensive or both. By "worked surface" is meant that surface of the crystal containing both visible defects and damage to the crystal structure which extends below the surface into the crystal lattice. In addition, many of the most satisfactory polishes known to the prior art often produce a condition of the crystal surface known as "orange-peel." This condition is described as an irregular surface of hills and valleys similar in appearance to the peeling of an orange. Such an undesirable surface finish is caused by a variety of factors not completely understood. Hence it is necessary to control closely the concentration of abrasive particles in the polish, the contamination in the polish, the length of polishing time, the pressure of the polishing discs, and other factors. Despite these controls, many polishes will produce an orange-peel finish before surface scratches are removed from the crystal.

It is therefore an object of this invention to provide an improved process for polishing semi-conductor materials to a high degree of surface perfection.

It is a further object of this invention to provide a polishing material capable of producing a high degree of surface perfection on semi-conductor materials.

Additional objects and advantages will become apparent from the following discussion and claims.

The present invention is based upon the discovery that silica sols or gels, preferably silica aquasols, can be used as polishing agents for certain materials to produce a mirror-like finish with a high degree of surface perfection. This discovery is particularly adaptable to the preparation of crystals for use in the production of semiconductor devices. In the manfuacture of these devices, a wafer of a material consisting of a single crystal is treated in such a manner that a very thin layer of the same material, perhaps 0.5 mil or less in thickness, is deposited from the gaseous state onto a surface of the crystal. This deposition, commonly referred to as epitaxial deposition, is of such a nature that all surface atoms of the crystal are covered uniformly with the deposited material and the deposited atoms become part of the single crystal structure. Hence any scratches, grooves, or pits on the original surface are exactly reproduced on the new surface of the crystal. These imperfections, as well as latent defects present near the surface of the original crystal, are undesirable because they may alter the electrical properties of areas of the wafer where they exist. This alteration can render that segment of the crystal unsuitable for the manufacture of semiconductor devices.

Since imperfections in the finished crystal can virtually be eliminated by providing a perfectly smooth surface free from visible and latent defects for deposition of the epitaxial layer, the necessity for developing some means of attaining this high degree of smoothness becomes apparent.

Before discussing the removal of these scratches and grooves, it is helpful in understanding the problem to see how they were caused. In the manufacture of these crystal wafers, an ingot is cut with a diamond-tipped saw to produce wafers several mils in thickness. Because of the cutting action of the saw, these wafers are scratched and grooved to such an extent that they are wholly unsuitable for the manufacture of semiconductor devices without further treatment. Consequently an abrasive is applied to the surface of the wafer and the surface is polished to remove the scratches caused by the saw. However, a polishing agent which will remove these imperfactions in a suitable length of time is necessarily so abrasive that it leaves its own scratches and grooves. Further, such a polish in working the surface also damages the crystal structure near the surface causing the latent defects previously mentioned. These latent defects become visible when the surface is etched with some suitable chemical preparation. Consequently, it is a common practice to employ a finer polish to remove the scratches and imperfections caused by the prior coarser abrasive. But this secondary polish will also cause its own scratches and imperfections.

A very desirable final polishing agent would therefore be one which would in a reasonable length of time remove all surface imperfections caused by the previous polishing agent without causing any further scratching by its own action. Furthermore, chemical etching of such a polished surface would reveal no damage to the crystal structure as evidenced by the appearance of scratches, grooves, or other imperfections.

Silica sols and gels fulfill these requirements of a final polishing agent to a very satisfactory degree. Processes by which silica sols and gels are prepared are well known to the prior art and can vary considerably in technique and operating conditions. In giving references to some of the compositions of, and processes for, the manufacture of silica sols and gels, it is not our intent to limit our invention to the use of the sols and gels so prepared. Rather our invention can be practiced by utilizing silica sols and gels prepared by many different methods.

A silica organo-aquasol suitable for use in our invention is described in U.S. Patent No. 3,046,234. This patent also contains a review of the prior art in which other suitable silica sols are mentioned. Other U.S. patents which disclose useful compositions or processes are: U.S. Patent No. 2,731,326, U.S. Patent No. 2,741,600, and U.S. Patent No. 3,012,973. Canadian patents which discuss methods of manufacturing suitable silica sols are Patents 609,186 and 609,190.

As mentioned above, most of the modifications in composition among the silica sols and gels are not limiting factors. However to accomplish the desired degree of polishing in a minimum amount of time, it is advisable to select a silica sol of proper particle size and $SiO_2$ concentration to maximize both of these objectives. These two variables of particle size and concentration are interdependent to some extent, thus providing a wide range of effective compositions. Silica sol concentrations from 5–50% $SiO_2$ are effective and concentrations as low as 2% are satisfactory as polishing agents if a longer polishing time is employed. Silica sols containing concentrations of $SiO_2$ greater than 50% by weight would undoubtedly also serve as adequate polishes if sols of such high concentrations were available. Presently therefore, this method is limited to the use of silica sols with a maximum of 50% $SiO_2$ by weight only because more concentrated sols are not yet a commercially available product. Likewise, a composition such as a silica gel in the form of a dry powder, jelly, or paste containing from 2–100% $SiO_2$ by weight is very useful as a polishing agent. Particles of $SiO_2$ as low as 5 millimicrons in diameter are effective in obtaining the high degree of smoothness required while particles of $SiO_2$ as large as 200 millimicrons are also acceptable as polishes. Compositions of silica sols which we have found very effective have a concentration of 10–40% $SiO_2$ by weight with a particle size of 10–75 millimicrons. Particle sizes given here and elsewhere in this discussion are ultimate particle sizes as determined from electron micrographs of air-dried films of sol diluted to 0.01% $SiO_2$ content with water. Aggregate particles caused by coagulation of several ultimate particles can of course be much larger but the size of such aggregate particles does not affect the practice of this invention. Compositions of silica gels which we have found suitable consist of a jelly or paste containing from 1–10% $SiO_2$ with a particle size of 10–75 millimicrons.

There are many materials capable of being polished to the requisite high degree of smoothness for epitaxial crystal deposition. These include silicon and germanium crystals; semiconductors of the III–V series comprising phosphides, arsenides, and antimonides of gallium and indium; semiconductors of the II–VI series comprising sulfides, selenides, and tellurides of zinc, cadmium and mercury; semiconductors of the I–VII series comprising fluorides, chlorides, bromides and iodides of copper, silver, and gold; and various organic compounds useful as semiconductor materials such as anthracene; metal phthalocyanines, especially copper phthalocyanine and zinc phthalocyanine; polyphthalocyanines; metal polyphthalocyanines, especially copper polyphthalocyanine; and chloranyldurenediamine type complexes.

In the practice of this invention, bars of a material are cut into wafers with a diamond-tipped saw. To remove the deep grooving from one surface of the wafer caused by this cutting action, a relatively coarse abrasive such as 2–20 micron alumina or garnet can be used to prepare the surface for polishing. The subsequent polishing is capable of considerable variation in materials used, number of successive polishing steps, length of time allotted for each step, materials used as polishes, inclusion or omission of an etching, etc. One technique, to which we do not wish to be limited, comprises the use of a diamond paste with a particle size of 1–5 microns followed by a subsequent polishing with a diamond paste of 0.1–0.5 micron particles. Such preliminary steps are advisable only insofar as they reduce the total amount of polishing time required. The crystal surfaces could be polished to a satisfactory finish from a very irregular surface with the silica sols or gels previously described if a sufficient amount of time is spent. Regardless of the manner in which the preliminary polishing is done, the final polishing is accomplished by the use of a silica sol or gel, preferably a sol containing 10–40% $SiO_2$ by weight with a particle size of 10–75 millimicrons. Polishing time required, and pressure and speed of the polishing discs are all related factors, and each condition can vary widely depending upon the values adopted for the other two. Suitable combinations of conditions are found in the examples, but normally the polishing time will be in the range of 5–30 minutes; the speed of the polishing disc in the range of 50–800 r.p.m.; and the pressure on the wafers from about 0.5 to 10 lbs. per sq. in. More helpful than setting up such limits is to regulate the polishing time required to that necessary to remove the desired surface; and the pressure and polishing speed so that the wafers are not broken or cracked and so that the polishing disc does not become overheated. After polishing, the surface of the crystal may be etched with some suitable preparation such as a composition containing 1 part HF, 3 parts $HNO_3$, and 4 parts of an aqueous solution of 1% $AgNO_3$; the crystal surface is then examined under a microscope. A satisfactory surface for epitaxial crystal deposition will be substantially free from surface imperfections visible at a magnification of 500×.

The invention will be more clearly understood from the following detailed descriptions of specific examples.

*Example I*

A cylindrical bar of silicon one inch in diameter was sliced with a diamond-tipped saw to produce wafers approximately 13 mils in thickness. These wafers were mounted on a metal block in such a manner that only one surface was exposed. The material used to attach the wafers to the block should be water-insoluble but yet soluble in some solvent which will not react with wafers when it becomes necessary to dissolve the material and remove the wafers from the block. The wafers were then lapped using garnet with a particle size of 10–20 microns on a glass surface for about ten minutes. After removing all loose particles by ultrasonic cleaning with water and detergent, the wafers were polished first with a 3 micron diamond paste and lubricant for 15 minutes using a soft felt polishing disc. A new polishing disc was used each time the polishing material was changed to minimize carry-over of larger particles from the previous step. This procedure of changing polishing cloths was also used in the other example given. The polish consisted of Elgin Dymo No. 3 (from Elgin National Watch Company, Precision Products Division) and glycerine in a 9:1 ratio. The ultrasonic cleaning apparatus used was a Sonogen Model LG40 manufactured by Branson Ultrasonic Corporation. Following ultrasonic cleaning, a 0.25 micron diamond paste with lubricant was applied for five minutes (Elgin Dymo No. 0.5 and glycerine). After another ultrasonic cleaning, the wafers were polished for 15 minutes with a silica aquasol containing 30% $SiO_2$ by weight with an ultimate particle size of 40–50 millimicrons. The speed of the polishing disc was maintained at 300 r.p.m. with a pressure of 3 lbs./sq. inch on the surface of the crystal wafers. The silica sol was applied to the wafers by allowing it to drip onto the rotating polishing cloth at the rate of 5 or 10 ml. per minute. Following rinsing with water and drying, the wafers were inspected under a microscope at a magnification of 200 times to determine whether they had acquired the desired structureless finish, i.e., freedom from scratches and other surface imperfections. Those that were suitable were removed from the metal block, cleaned with solvents, and then etched with an acid etching composition consisting of 1 part HF and 19 parts $HNO_3$. This solution was applied for 1 or 2 minutes, then washed from the wafer. Those wafers which retained their structureless finish were approved for epitaxial crystal deposition; the others were returned for additional polishing with silica sol. Records kept on this method of polishing show that 95% of the wafers polished as described above acquire surfaces suitable for epitaxial deposition without the necessity for additional polishing.

*Example II*

The procedure set forth in Example I was followed except that a silica aquasol containing 30% $SiO_2$ by weight with an ultimate particle size of 10–25 millimicrons was used as the final polishing agent. The wafers were polished for 20 minutes and then treated as described in Example I. Surfaces treated in this manner were suitable for epitaxial crystal deposition.

*Example III*

The procedure set forth in Example I was followed except that a silica aquasol containing 40% $SiO_2$ by weight with an ultimate particle size of 40–50 millimicrons was used as the final polishing agent. The wafers were polished for 15 minutes and then treated as described in Example I. Surfaces treated in this manner were suitable for epitaxial crystal deposition.

*Example IV*

The procedure set forth in Example I is followed except that a silica organo-aquasol containing 30% $SiO_2$ by weight with a particle size of 40–50 millimicrons is used as the final polishing agent. The liquid phase of this sol consists of 25% ethylene glycol and 75% water. The wafers are polished for ten minutes and then treated as described in Example I. Surfaces treated in this manner are suitable for epitaxial crystal deposition.

*Example V*

The procedure set forth in Example I was followed except that a paste comprising water and 5% silica gel by weight with a particle size of 40–50 millimicrons was used as the final polishing agent. The wafers were polished for 15 minutes and then treated as described in Example I. Surfaces treated in this manner were suitable for epitaxial crystal deposition.

*Example VI*

Following considerable experimentation, a preferred procedure for polishing gallium arsenide and silicon wafers was devised. It comprised five minutes polishing with a 3 micron diamond paste; three minutes polished with a 1 micron diamond paste; nine minutes polishing with a 0.25 micron diamond paste; and 30 minutes polishing with the silica sol previously described in this example. Ultrasonic cleaning with water and detergent was employed after each diamond polishing, and copious rinsing with water was used after the silica sol treatment. This treatment produced a perfectly smooth surface free from surface scratches and crystallographic disorders.

*Example VII*

An ingot of GaAs 1.5 cm. in diameter was sliced with a diamond-tipped saw to produce wafers about 19 mils thick. These wafers were mounted on a stainless steel block so that only one surface was exposed and then lapped with 1200 mesh alumina and 3200 mesh alumina for five minutes each. After ultrasonic cleaning with water and detergent, the wafers were polished for five minutes with a 3 micron diamond paste and lubricant. Following another ultrasonic cleansing operation, the wafers were polished for three minutes with a 1 micron diamond paste and lubricant. After another ultrasonic cleaning, the wafers were polished for nine minutes with 0.25 micron diamond paste and lubricant. Following this preparatory polishing and cleaning, the wafers were polished for 15 minutes with a silica aquasol containing 30% $SiO_2$ by weight with a particle size of 10–25 millimicrons. The polishing cloth was changed, the wafers were rinsed, and the last step was repeated. An acid etch of a surface treated in this manner revealed a surface suitable for epitaxial crystal deposition.

*Example VIII*

The procedure set forth in Example VII is followed except that a silica aquasol containing 40% $SiO_2$ by weight with a particle size of 40–50 millimicrons is used as the final polishing agent. Surfaces treated in this manner are suitable for epitaxial crystal deposition.

*Example IX*

The procedure set forth in Example VII was followed except that a silica organo-aquasol containing 30% $SiO_2$ by weight with a particle size of 40–50 millimicrons was used as the final polishing agent. The liquid phase of this sol consisted of 15% glycerine and 85% water. Surfaces treated in this manner were suitable for epitaxial crystal deposition.

*Example X*

The procedure set forth in Example VII is followed except that a paste comprising a lubricant and 5% silica gel by weight with a particle size of 40–50 millimicrons is used as the final polishing agent. Surfaces treated in this manner are suitable for epitaxial crystal deposition.

*Example XI*

The procedure set forth in Example VII is followed except that a crystal wafer of zinc selenide is used as the substrate. Surfaces treated in this manner are suitable for epitaxial crystal deposition.

*Example XII*

The procedure set forth in Example I is followed except that a crystal wafer of germanium is used as the substrate. Surfaces treated in this manner are suitable for epitaxial crystal deposition.

Although the invention has been described in terms of specific embodiments which are set forth in considerable detail, it should be understood that this is done for illustrative purposes only and that the invention is not necessarily limited thereto since alternative embodiments and operating techniques will become apparent to those skilled in the art in view of this disclosure. As an example, even though the bulk of the previous discussion has been directed toward the preparation of surfaces for epitaxial crystal deposition, this invention can easily be extended to include the polishing of several kinds of materials for other purposes where epitaxial deposition is not necessary. The polishing of precious and semi-precious gems with silica sols and gels is suggested; likewise the polishing of optical lenses is also feasible. Many other materials can be improved by the practice of this invention, which materials are limited only by their hardness as measured on Moh's hardness scale. Generally, semi-conductor materials which a hardness rating from about 2 to about 7 can be polished adequately by using silica sols or gels and adjusting the various conditions of pressure, disc speed, polishing time, and concentration and size of the $SiO_2$ particles. If a finish suitable for epitaxial deposition is not necessary, even softer semi-conductor materials with the hardness number of 1 or 1:5 can be polished to a high degree of surface perfection. Another variation possible if a surface is not being prepared for epitaxial crystal deposition is the particle size of the $SiO_2$, which may be larger than 200 millimicrons in these cases.

Another area which is subject to wide variation is the composition of the silica sol or gel used as the polishing agent. The examples mention the use of silica organo-aquasols. However, the use of a silica organo-sol is definitely suggested, particularly if the material to be polished is soluble to any appreciable extent in water.

Still a third feature obviously capable of variation is the polishing preparatory to the use of the silica sols or gels. The hardness of the material is a factor in this step and a relatively soft material might be polished solely with a silica sol or gel.

Previously in the specification, the various types of semiconductive materials which may be polished by the process of this invention have been mentioned in some detail. Obviously this process is equally applicable to semiconductive materials modified by the addition of dopants, i.e., substances which, when added to the semiconductor, will alter its electrical characteristics. Consequently these and other modifications are contemplated which can be made without departing from the spirit of the described invention.

What is claimed is:

1. A process for polishing semiconductor materials selected from the group consisting of silicon, germanium, semiconductors of the I–VII series, semiconductors of the II–VI series, semiconductors of the III–V series, and organic semiconductor compounds, to a high degree of surface perfection suitable for epitaxial crystal deposition, which process comprises polishing the abovementioned materials with a substance selected from the group consisting of silica sols and silica gels; and further provided that the said silica sol has a $SiO_2$ concentration of from 2–50% by weight with an ultimate particle size of from 5–200 millimicrons, and that the said silica gel has a particle size of from 5–200 millimicrons.

2. A process for polishing silicon to a high degree of surface perfection suitable for epitaxial crystal deposition, which process comprises polishing the silicon with a silica sol containing from 10–40% $SiO_2$ by weight with a particle size of from 10–75 millimicrons.

3. A process according to claim 2 wherein the said process comprises polishing with a silica gel in the form of a jelly or paste containing from 1–10% $SiO_2$ by weight with a particle size of from 10–75 millimicrons.

4. A process for polishing gallium arsenide to a high degree of surface perfection suitable for epitaxial crystal deposition, which process comprises polishing the gallium arsenide with a silica sol containing from 10–40% $SiO_2$ by weight with a particle size of from 10–75 millimicrons.

5. A process according to claim 2 wherein the said process comprises polishing with a silica gel in the form of a jelly or paste containing from 1–10% $SiO_2$ by weight with a particle size of from 10–75 millimicrons.

6. A process for polishing germanium to a high degree of surface perfection suitable for epitaxial crystal deposition, which process comprises polishing with a silica sol containing from 10–40% $SiO_2$ by weight with a particle size of from 10–75 millimicrons.

7. A process according to claim 4 wherein the said process comprises polishing with a silica gel in the form of a jelly or paste containing from 1–10% $SiO_2$ by weight with a particle size of from 10–75 millimicrons.

8. A process for polishing semiconductor materials having a hardness on the Moh's scale of hardness from about 2 to about 7, to a high degree of surface perfection comprising polishing said materials with a substance selected from the group consisting of silica sols and silica gels.

9. A process for polishing semiconductor materials having a hardness on the Moh's scale of hardness from about 2 to about 7, to a high degree of surface perfection suitable for epitaxial crystal deposition comprising polishing said materials with a substance selected from the group consisting of silica sols and silica gels.

10. A process for polishing semiconductor materials selected from the group consisting of silicon, germanium, semiconductors of the I–VII series, semiconductors of the II–VI series, semiconductors of the III–V series and organic semiconductor compounds, to a high degree of surface perfection comprising polishing said materials with a substance selected from the group consisting of silica sols and silica gels.

11. A process for polishing semiconductor materials selected from the group consisting of silicon, germanium, semiconductors of the I–VII series, semiconductors of the II–VI series, semiconductors of the III–V series, and organic semiconductor compounds, to a high degree of surface perfection suitable for epitaxial crystal deposition comprising polishing said materials with a substance selected from the group consisting of silica sols and silica gels.

References Cited in the file of this patent

UNITED STATES PATENTS

| | | |
|---|---|---|
| 2,445,901 | Ambrose | July 27, 1948 |
| 2,628,896 | Erasmus et al. | Feb. 17, 1953 |
| 2,649,388 | Wills et al. | Aug. 18, 1953 |
| 2,694,004 | Coffeen | Nov. 9, 1954 |
| 2,731,326 | Alexander | Jan. 17, 1956 |
| 2,744,001 | Harman et al. | May 1, 1956 |
| 2,914,413 | Mercer | Nov. 24, 1959 |
| 2,944,879 | Allen et al. | July 13, 1960 |
| 3,029,160 | Van der Beck | Apr. 10, 1962 |
| 3,071,455 | Harman et al. | Jan. 1, 1963 |
| 3,081,586 | Gersbach | Mar. 19, 1963 |

UNITED STATES PATENT OFFICE
CERTIFICATE OF CORRECTION

Patent No. 3,170,273 February 23, 1965

Robert J. Walsh et al.

It is hereby certified that error appears in the above numbered patent requiring correction and that the said Letters Patent should read as corrected below.

Column 5, line 42, for "polished" read -- polishing --; column 6, line 50, for "which" read -- with --; line 56, for "1:5" read -- 1.5 --; column 7, line 35, for the claim reference numeral "2" read -- 4 --; line 44, for the claim reference numeral "4" read -- 6 --.

Signed and sealed this 20th day of July 1965.

(SEAL)
Attest:

ERNEST W. SWIDER
Attesting Officer

EDWARD J. BRENNER
Commissioner of Patents